Figure 1:
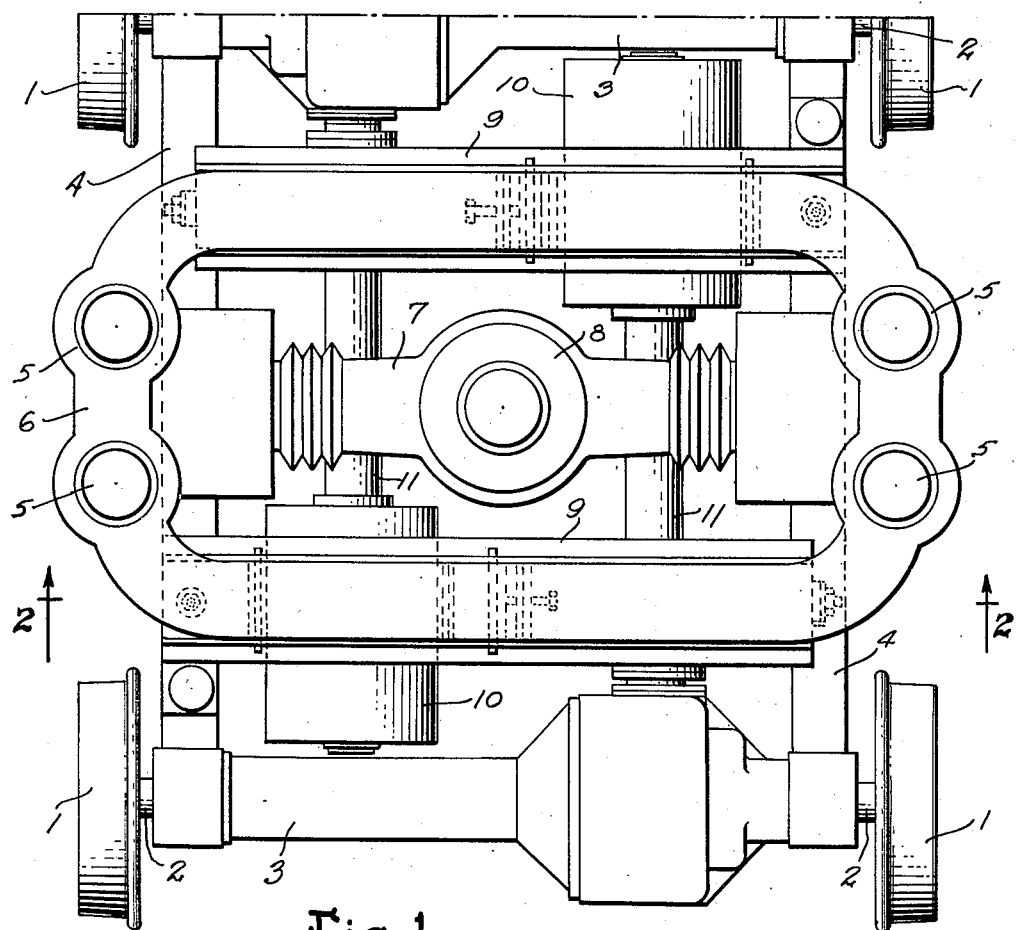

Sept. 12, 1944.   E. H. PIRON   2,358,279
MOTOR SUSPENSION AND TRUCK CONSTRUCTION
Filed Oct. 11, 1941   2 Sheets-Sheet 1

Inventor
Emil H. Piron
Attorney

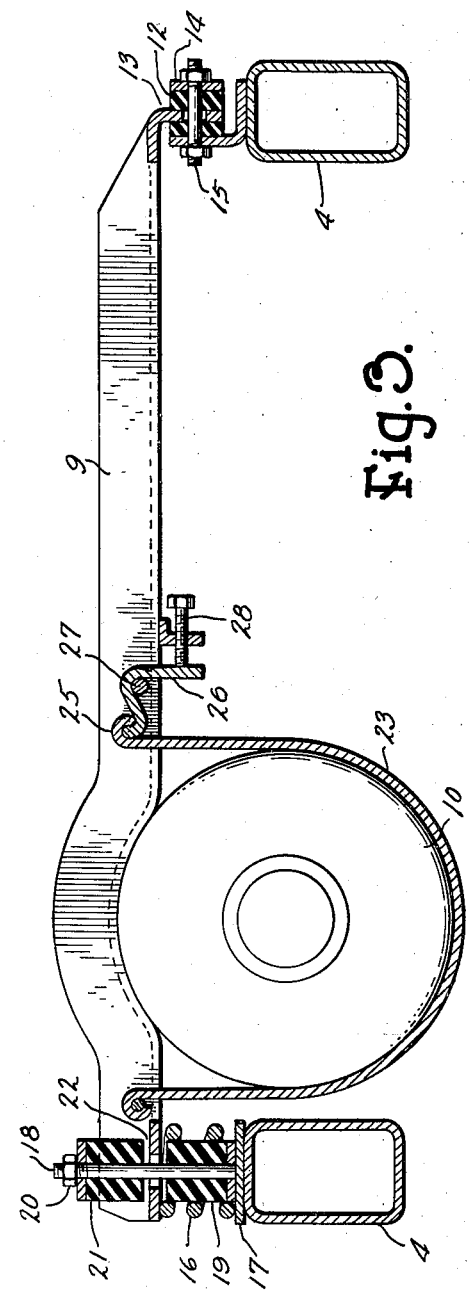
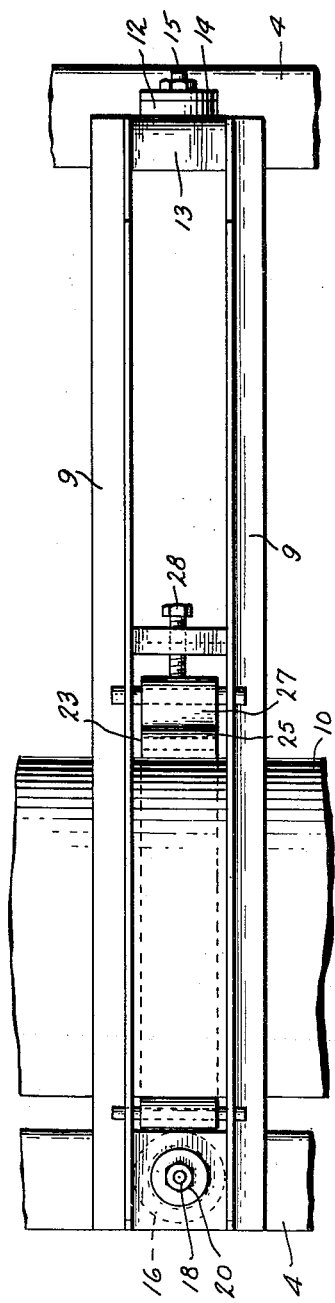

Patented Sept. 12, 1944

2,358,279

UNITED STATES PATENT OFFICE 2,358,279

MOTOR SUSPENSION AND TRUCK CONSTRUCTION

Emil H. Piron, New York, N. Y., assignor to Transit Research Corporation, New York, N. Y., a corporation of New York Application October 11, 1941, Serial No. 414,589

4 Claims. (Cl. 105—133)

This invention relates to the suspension of propelling motors in a self-propelled rail truck and has for its object to provide a motor suspension suitable for high speed motors and which will transmit a minimum of vibrations to a car body.

Another object is to provide a suspension for small, high-speed motors in a rail truck which has a main frame unsprung with respect to the journal bearings, a frame which carries the truck bolster and center bearing and which is sprung from the main frame, the motors being separately sprung from the main frame. I am aware that heavy and bulky low speed motors have been sprung from an unsprung frame, but the problem is different where the motors are of the small, high speed type where road shocks may easily disturb the brush contact at the commutator and cause destruction and flushing.

It is an object of the invention to provide a motor suspension from an unsprung frame which will be so soft as to minimize the vibrations transmitted to the car body thereabove and so stiff that the motor will not move unduly from its normal position under its own torque and under the action of acceleration, deceleration and road shocks.

More particularly, it is an object to provide a transverse beam for supporting the motors, each motor being substantially offset from the center of its beam and to spring the beams from their ends, the end of the beam furthest from the motor having a very soft spring since it carries small weight, the spring means at the short end of the beam being composed of a composite spring composed of a rubber and a steel spring in which the steel spring is, preferably, of coil type which is practically free of hysteresis, and which has a rate of deflection sufficiently low so that, in combination with the supported mass, it will have a natural frequency much lower than the frequency of the objectionable vibrations which may be produced by the motor; and in which the rubber spring carries no part of the static load but comes into action after the steel spring has begun resistance to deflection of dynamic loads and shares in resisting the variable forces developed during operation, such as are developed, for instance, by the torque of the motor.

It is true that variable speed motors can develop vibrations at any frequency, depending on the speed at which they are run but, in general, such vibrations become objectionable only when they find a harmonic resonance with some part of the vehicle, such as the floor, roof, windows, seats or the like and care should be taken to build all parts sufficiently stiff so that no response is found until fairly high frequencies are reached. Thus, in the newer street cars there is no objectionable response up to 25 cycles per second and, as an example, it is satisfactory in those cars to use a coil motor supporting spring which, in combination with the part of the mass it supports, produces a natural oscillation having a frequency ranging from 2½ to 5 cycles per second although the lower the frequency the smaller will be the transmission of vibrations. The lower limit of the permissible deflection may be found from the formula $$d = \frac{9.777}{f^2} \text{ inches}$$

where $f$ is frequency in cycles per second of the sprung mass. In the above mentioned case $d = 9.777 \div (5)^2 = 0.4$ inch. While 0.4 inch is the minimum deflection which should be used an optimum deflection is about one inch, or, roughly, twice the minimum.

Now, suppose that the given weight of sprung mass carried by this spring is 600 pounds and that the load on the steel spring increases and decreases by a maximum of 100 pounds according to whether the motor is accelerating or decelerating, the force developed in the spring by the action of the motor is ⅙ of the static load and the average position of the motor may vary with the limits at ⅙ inch from its static position.

In choosing the rubber spring it is recommended that it be so designed as to be brought into action only after the steel spring has begun resistance to a part of these forces developed by the motor and preferably when these forces have attained approximately half their value. In other words, it is recommended that the rubber spring offer resistance after a deflection by the steel spring of ¹⁄₁₂ inch in the example given and that it have a rate of deflection which is relatively small at low loads but progressively larger at high loads. In the above example, the rate of deflection of the rubber spring is 0.1 inch under 50 pounds, 0.2 inch under 120 pounds and 0.3 inch under 200 pounds. The maximum deflection was limited to ⁵⁄₃₂ inch in up or down directions.

The foregoing example has been given because it is impossible to lay down a formula for all conditions and for all types of cars. The rate of deflection of the rubber spring should be as low as the maximum freedom allowed for the sprung mass permits. Also the foregoing example takes into consideration only vertical vibrations whereas the same rules and principles apply to vibrations in a transversal or longitudinal direction.

Figure 2:
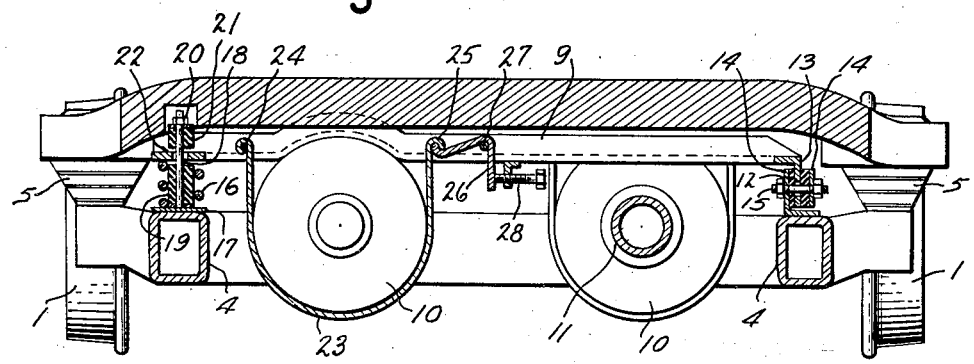

A better understanding of the invention will be had with reference to the accompanying drawings in which my invention is illustrated by way of example and in which Fig. 1 is a top plan view of rail truck in which my invention may be installed, Fig. 2 is a vertical section taken along the line 2—2 of Fig. 1, omitting the bolster and other irrelevant truck parts, Fig. 3 is an enlarged view of a portion of the showing of Fig. 2, illustrating the invention, and Fig. 4 is a top elevation of the showing of Fig. 3.

More particularly, 1 indicates the wheels of a rail truck connected in pairs by axles 2 enveloped by axle housings 3. The housings 3 constitute main frame members which are connected by main side frames 4. A plurality of springs 5 support an auxiliary frame 6 from the side frames 4, which frames carry a truck bolster 7 having a center bearing member 8 upon which one end of a car body is adapted to seat.

Also spanning the distance between the side frames 4 are two motor carrying beams 9 for the two motors 10 which are oppositely arranged at diagonally spaced positions in the truck for driving opposite axles 2 through propeller shafts 11. The beams and suspensions of both motors are the same so that only one will be referred to hereinafter.

Each motor is necessarily offset with respect to the center of its beam 9 so that one end is subjected to heavier loading than the other. The lightly loaded end is supported from its side frame 4 by a spring composed of rubber elements 12, one on each side of the down-turned end 13 of the beam, end plates 14 and a retaining bolt 15 which passes freely through an enlarged opening in the end portion 13. The rubber elements resist vertical loading in shear and horizontal loading in compression. The movements are small and this spring may be considered simply as a universal joint or flexible connection in which vertical motion is resisted by a spring curve having a substantially constant load deflection ratio.

The other end of the beam 9 is supported from its side frame 4 by a coil spring 16 which rests on a plate 17 fixedly attached to the frame 4, as by welding, and which has a bolt 18 arising therefrom. This spring has a substantially constant load deflection ratio as is typical of coil springs. A rubber spring 19 of the unconfined compression type freely surrounds the bolt 18 and has slightly less length than that of the coil spring 16 after the coil spring is given its full static load. This spring has a load deflection ratio increasing with increasing load. Preferably, it comes into action after the coil spring has resisted a substantial portion of the dynamic load alone.

The bolt 18 extends freely through an enlarged opening in the beam 9 and has a nut 20 on the outer end thereof for retaining a rubber spring 21 thereon, the spring 21 being similar to the spring 19 and providing a slight clearance 22 with the beam 9 substantially equal to clearance between the spring 19 and the beam 9 under statically loaded conditions. One or the other of these springs 19 or 21 will offer resistance to movements of the beam 9 when the up and down movements exceed the clearances.

Supporting the motor 10 from the beam 9 is a strap or steel band 23 pivotally connected thereto at 24 and having an opposite end bent as illustrated at 25. A bell crank lever 26 pivotally mounted at 27 engages the hooked end 25 under the influence of a screw 28 to produce tension in the band 23 thereby tightening the motor against the beam 9.

What I claim is:

1. A motor support comprising a beam from which the motor is supported at points offset from the center thereof whereby one end of the beam carries a heavier loading than the other end, a spring having a substantially constant load deflection ratio supporting the lightly loaded end of the beam, and a spring means supporting the other end of the beam comprising one spring having a substantially constant load deflection ratio adapted to sustain all static loading and a second spring operative in parallel therewith to sustain at least a part of the loading in excess of the static loading, said second spring having an increasing load deflection ratio.

2. A motor support comprising a beam from which the motor is supported at points offset from the center thereof whereby one end of the beam carries a heavier loading than the other end, a flexible joint supporting the light end of the beam, and spring means supporting the other end of the beam, said spring means comprising a first spring having a substantially constant load deflection ratio and arranged to sustain all static loading and solely to sustain approximately half of the dynamic loading imposed by the torque of the motor and a second spring constructed and arranged to share jointly with said first spring all loading in excess of that sustained solely by said first spring.

3. A motor support comprising a beam from which the motor is supported at points offset from the center thereof whereby one end of the beam carries a heavier loading than the other end, a spring of rubber-like material supporting the lighter end of said beam and resisting vertical loading thereon in shear, and a spring means supporting the other end of said beam comprising a steel coil spring and a spring of rubber-like material arranged to share the loading on said coil spring jointly.

4. In a rail truck, the combination of a main unsprung frame, a body carrying frame sprung from said main frame, beams for supporting the propulsion motors for said truck spanning the distance between the side frames of said main frame and each having a motor supported therefrom at points nearer one end thereof than the other, a spring supporting the light end of each of said beams composed of rubber-like material arranged to resist vertical loading in shear, and a spring means supporting the other end of each of said beams comprising a coil spring arranged to sustain all static loading at its end of the beam, a second spring of rubber-like material concentric with said coil spring and having a slight clearance with respect to said beam, and a third spring-like cushion above said beam near said spring means for limiting the upward movements thereof.

EMIL H. PIRON.